side upon which is arranged the braces and tie-rods, as indicated in Fig. 1. This provides a substantially plane front side for the fence. The wires may be secured firmly in the notches of the posts, stays, &c., by bending the edges of the notches over the same. Also, the feet of the stays F may rest upon the surface of the ground as shown or may be planted a short distance as desired.

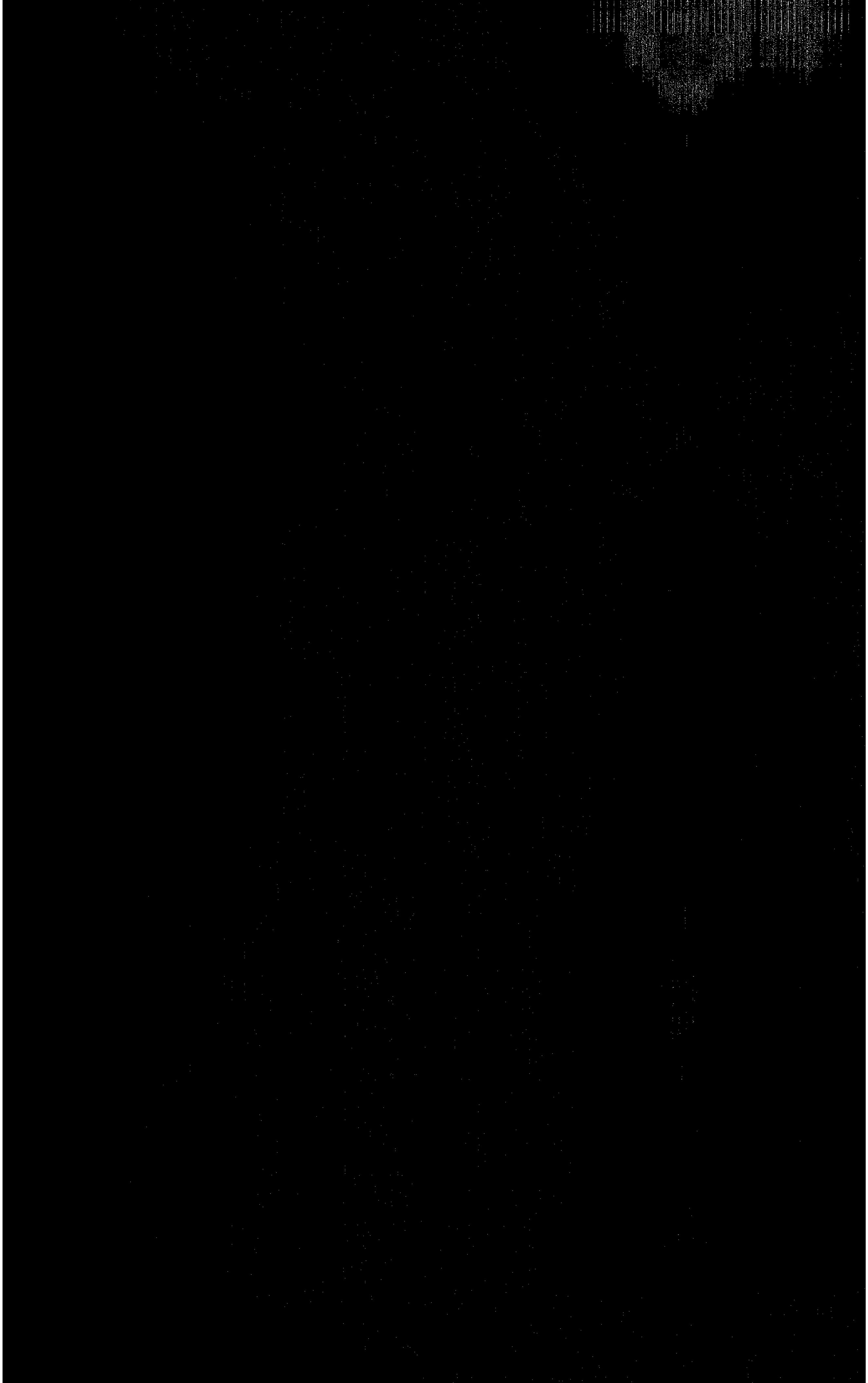

Having thus described our invention, what we claim, and desire to secure by Letters Patent of the United States, is—

1. In a fence, the hereindescribed flat metal post having wire-receiving notches in one edge of its blade and provided near its lower end with a quarter twist terminating in a laterally bent foot D which extends parallel with the plane of the blade of the post, and transverse to the line of the fence, substantially as specified.

2. In a fence, the combination of posts provided with downwardly inclined notches, the wires resting in said notches, the stays provided with upwardly inclined notches engaging the wires and having horizontal feet and stay-bars engaging and supported by the upper wires and having upwardly inclined notches, substantially as specified.

In testimony that we claim the foregoing as our own we have hereto affixed our signatures in the presence of two witnesses.

CHARLEY WALLING.
WARREN THOS. METCALF.

Witnesses:
N. H. SADLER,
W. D. OWEN.